(12) United States Patent (10) Patent No.: US 8,693,061 B2
Sanger (45) Date of Patent: Apr. 8, 2014

(54) METHOD OF EMBEDDING DATA IN PRINTED HALFTONE FEATURES ON A RECEIVER

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 315 days.

(21) Appl. No.: 13/185,846

(22) Filed: Jul. 19, 2011

(65) Prior Publication Data

US 2013/0019767 A1 Jan. 24, 2013

(51) Int. Cl.
*H04N 1/40* (2006.01)
*B41F 1/00* (2006.01)
*G03F 7/00* (2006.01)

(52) U.S. Cl.
USPC ......... 358/3.28; 358/1.9; 358/3.06; 358/3.17; 358/534; 101/287; 430/306

(58) Field of Classification Search
None
See application file for complete search history.

(56) References Cited

U.S. PATENT DOCUMENTS

| 6,731,405 | B2* | 5/2004 | Samworth ..................... 358/3.06 |
| 6,752,432 | B1* | 6/2004 | Richardson ..................... 283/91 |
| 7,174,031 | B2 | 2/2007 | Rhoads et al. |
| 7,286,685 | B2 | 10/2007 | Brunk et al. |
| 7,436,977 | B2 | 10/2008 | Wang et al. |
| 7,528,993 | B2* | 5/2009 | Rosen ........................... 358/3.28 |
| 7,554,699 | B2 | 6/2009 | Wang et al. |
| 8,015,919 | B2* | 9/2011 | Boswell et al. ............... 101/488 |
| 2008/0019559 | A1 | 1/2008 | Wang et al. |
| 2010/0060943 | A1 | 3/2010 | Monga et al. |
| 2010/0143841 | A1 | 6/2010 | Stolt et al. |

OTHER PUBLICATIONS

Bulan et al.: Data Embedding in Hardcopy Images Via Halftone-Dot Orientation Modulation; SPIE-IS&T, vol. 6819, 2008.
Oztan et al.; Multiplexed Clustered-Dot Halftone Watermarks Using Bi-Directional Phase Modulation and Detection; Proc. 2010 IEEE, 17th International Conference on Image Processing, Sep. 2010, pp. 981-984.
Walker and Fetsko; A Concept of Ink Transfer, American Ink Maker, Dec. 1955, pp. 38-44, 69, and 71.

\* cited by examiner

*Primary Examiner* — Steven Kau
(74) *Attorney, Agent, or Firm* — Nelson Adrian Blish

(57) ABSTRACT

A method of encoding data in printed halftone image features on a receiver includes providing a relief printing member; encoding first embedded data in the relief printing member by modifying surfaces of a first plurality of halftone dots; and printing the halftone image on the receiver.

3 Claims, 13 Drawing Sheets

METHOD OF EMBEDDING DATA IN PRINTED HALFTONE FEATURES ON A RECEIVER

CROSS REFERENCE TO RELATED APPLICATIONS

Reference is made to commonly-assigned U.S. patent application Ser. No. 13/017,260 (now U.S. Publication No. 2012/0196229), filed Jan. 31, 2011, entitled EMBEDDING DATA INTO SOLID AREAS, TEXT OR LINEWORK, by Sanger; the disclosure of which is incorporated herein.

FIELD OF THE INVENTION

The invention applies in general to embedding data into a halftone image and in particular to embedding data on halftone dots for flexographic printing.

BACKGROUND OF THE INVENTION

Many labels and packaging materials are printed using flexography, a printing method that uses a relief plate. Flexographic relief plates may be made from rubber or a photopolymer. Traditional rubber plate precursors may be molded, carved, or ablated with a laser to form the relief. Photopolymer plate precursors are exposed with ultra-violet light through a mask to harden the photopolymer. Then the unexposed polymer is washed out, the plate is dried, then an additional ultra-violet exposure is used to detack or cure any remaining uncured photopolymer. The exposed areas form the relief used to print the image.

The relief is typically 500 um to 1000 um measured from the top of the plate to the floor or non-imaging portion of the plate. For a photopolymer plate the floor is exposed from the back side and may be varied by changing the back side ultra-violet exposure. Both rubber and photopolymer plates are typically mounted to a polyester support. Plates are mounted to printing cylinders or sleeves using a double back compressible tape. Engraved rubber-coated cylinders or sleeves are also used. Unless otherwise specified in the following description, the term plate refers to any form of relief printing member.

In a flexographic printing press, ink is coated onto an Anilox roll and then transferred to the flexographic relief plate. The plate is then pressed against a receiver backed by an impression roller. Receivers may be uncoated paper, coated paper, polymers, glass, ceramics, wood, corrugated board, hard board, or metals. The printed density is dependent upon the Anilox cell volume, the ink, the pressure between the plate and the Anilox roller, the pressure between the plate and the receiver, and the receiver.

To print grey scale images, relief features comprising size-modulated halftone dots or spatial frequency-modulated dots are used. Artistic methods such as line drawings may also be used. The grey scale or tone scale is calibrated by printing test patches with no compensation. The density of each patch is measured and an effective dot area is computed based on the measured density. Then a compensation curve is created to compute the dot area required to obtain a desired printed density.

Flexographic printing has difficulty imaging extremely small dots. Dots between 0% and 5% by area, less than 20 um in diameter, may image extremely dark or not image at all. Typically press operators limit the smallest dot size printed to a minimum of 4-10%, 20-30 um diameter, to avoid these quality issues. The dot gain when printing a 20% dot on plate may result in a density that corresponds approximately to 50% dot area coverage. Flexography has a typical 25-35% dot gain at a 20% input level. The printed density keeps increasing until the 80-90% dot level, at which point density then decreases to the solid density at 100%. This behavior results in a calibration curve that starts at 0%, jumps to a minimum output dot of 4-6%, then a region of image highlights between 4-10%, a region of midtones between 10-30%, a region of shadow details between 40%-85%, and finally solid features are imaged at 100%. The compression of the highlights makes them difficult to control and increases the quantization on the print. The tone scale on press will also depend upon how the plate relief is made and the impression between the plate and the receiver.

Color images are printed using flexography by employing well known color separation techniques wherein each color has its own grey scale image. Calibrating each color and simultaneously controlling every color on press is a challenge. Newer presses with feedback on impression and servo-driven cylinders, along with digitally created plates, have enabled color flexographic printing that rivals offset lithography.

The local relief within a grey scale image will be much lower than the relief between the top of the plate and the floor. For a photopolymer plate a 50% tint will have a local relief depth between dots of 100-200 um. A single 20 um×20 um hole corresponding to a 98.6% halftone at 150 lines per inch will have a depth of 10-30 um.

Recent advances as taught in U.S. Publication No. 2010/0143841 (Stolt et al.) discuss modifying the plate surface by applying a pattern to substantially all image feature sizes of the halftone image data to reduce the transparency of image areas of a mask by a constant amount. The resultant mask can be affixed to a plate precursor to form an intimate contact with, and a gaseous barrier to, the plate precursor. The plate precursor can then be exposed to curing radiation and the mask removed. After processing, the precursor forms a relief plate carrying a relief image that resolves the pattern in the surface of relief features. The print densities of solid features are substantially maintained or increased when the pattern is applied to solid relief features. Among the advantages of using this method are increased dynamic range and more uniform density. Applying a texture pattern to the surface of a flexographic printing plate is performed by advanced screening technology called DigiCap available from Eastman Kodak Company as described at http://graphics.kodak.com/US/en/Product/value_in_print/advancedFlexoScreening/digicapImaging/default.htm.

There are many advantages to encoding data into printed works. One may wish to encode copyright information, additional information about a product, a remote internet address or link, or encrypted data to indicate authenticity or make it more difficult to copy. One common data encoding method is to embed a watermark within the image. U.S. Pat. No. 7,174,031 (Rhoads et al.) list many methods of encoding data in images. In addition it discusses many additional uses for encoded data.

There are many known methods of performing steganography, embedding data, or watermarks, in printed images. There are also many known methods of applying visible data or watermarks in printed images.

U.S. Publication No. 2008/0019559 (Wang et al.) modulates a halftone dot with a screened high frequency pattern. Wang et al. (2008/0019559) modulate each pixel printed on an electrophotographic printer using a different halftone texture. This causes a visible seam between different halftone techniques that creates the visible watermark on the print.

Wang et al. (2008/0019559) teaches that "Halftoning techniques are necessary because the physical processes involved are binary in nature or the processes have been restricted to binary operation for reason of cost, speed-memory, or stability in the presence of process fluctuations. Examples of such processes are: most printing presses; ink jet printers; binary cathode ray tube displays; and laser xerography." [pg. 3 para. 0036]. Adding a high frequency screen to the halftone dot reduces its dot area requiring an additional dot gain table and the printing of a larger dot. Printing a larger dot is a disadvantage in relief printing.

Wang et al. (2008/0019559) also state "Examples of AM-FM halftones include "green-noise" halftones, halftones on space filling curves, and halftones with texture control", [pg. 3 para. 0042]. Texture control describes the print visibility of high frequency FM noise and sharpness of FM prints verses the visibility of the AM Halftone especially in the highlight areas of the print. The AM-FM Halftoning technique replaces AM screening with FM screening in the highlight areas.

U.S. Publication No. 2010/0060943 (Monga et al.) describes decoding message data embedded in an image print using halftone dot orientation. Bulan et al., "Data Embedding In Hardcopy Images Via Halftone-Dot Orientation Modulation", Proc of SPIE-IS&T Electronic Imaging, Vol. 6819, (2008), embed data in a print by modulating the orientation of an elliptical halftone dot.

U.S. Pat. No. 7,554,699 (Wang et al.) modulates printed shadow images with hybrid halftone dots consisting of amplitude modulated (AM) dots with frequency modulation (FM). Wang et al. (U.S. Pat. No. 7,554,699) use a hidden bi-level pattern mask (M) to create a combined halftone image (W) using $W=(H_1 \cap M) \cup (H_2 \cap -M)$, where $H_1$ is the original AM modulated halftone image; $H_2$ is the image of a FM halftone dot; A∩B is the intersection of A with B; A∪B is the union of A and B. This method results in the following table:

| Watermark M | Amplitude Modulated Halftone H1 | M ∩ H1 | Frequency Modulated Screen H2 | ~M ∩ H2 | (M ∩ H1) ∪ (~M ∩ H2) |
|---|---|---|---|---|---|
| Off | Off | Off = H1 | Off | On = ~H2 | H1 ∪ ~H2 |
| Off | Off | Off = H1 | On | Off = ~H2 | H1 ∪ ~H2 |
| Off | On | On = H1 | Off | On = ~H2 | H1 ∪ ~H2 |
| Off | On | On = H1 | On | Off = ~H2 | H1 ∪ ~H2 |
| On | Off | On = ~H1 | Off | Off = H2 | ~H1 ∪ H2 |
| On | Off | On = ~H1 | On | On = H2 | ~H1 ∪ H2 |
| On | On | Off = ~H1 | Off | Off = H2 | ~H1 ∪ H2 |
| On | On | Off = ~H1 | On | On = H2 | ~H1 ∪ H2 |

Areas with no watermark are printed with an inverted FM screen surrounding traditional AM halftone dots. In areas where the watermark is on, the normally AM modulated halftone dot areas are embedded with an FM screen. In areas where the watermark is on the surrounding areas without AM modulated halftone dots are printed as solids.

FM screens use the smallest feature sizes that may print reliably. For offset lithography the smallest feature size may be as small as 10 um by 10 um but more likely printers will use a 20 um by 20 um feature as the smallest available. As feature sizes decrease they are more difficult to control over the length of the print run. For flexography the smallest dot is typically limited to be above 3-5%. At 150 dpi a 3% dot is a 29 um×29 um feature. State of the art flexography is capable of imaging isolated 10 um by 10 um dots, using servo controlled cylinders with servo controlled impression. However state of the art flexography does not image 10 um by 10 um holes in solids such that the calibration curve typically jumps from 85% to 100% making it unobvious to use isolated 10 um by 10 um holes to modulate an AM flexographic dot. If flexography did reproduce 10 um by 10 um holes, and if 10 um by 10 um holes were added to an amplitude modulated halftone dot, for instance a 30% dot, then there would be a large difference in dot area on the print which requires compensation by printing in the background of the AM dot. The large dot gain in relief printing is problematic for the printing of fine stochastic screens and small holes within halftone dots.

Suh et al., "Printer Mechanism-Level Data Information Embedding and Extraction for Halftone Documents—New Results", Purdue University, embed data in a halftone image by modulating the halftone dot position.

Oztan and Sharma, "Multiplexed Clustered-Dot Halftone Watermarks Using Bi-Directional Phase Modulation and Detection", Proc. 2010 IEEE $17^{th}$ International Conference on Image Processing, September 2010, embed watermarks by shifting the phase of the halftone pattern in the area of the watermark. This is another form of moving the centroid of the halftone dots.

U.S. Pat. No. 7,436,977 (Wang et al.) describe using a first stochastic screen in areas outside of a watermark, with a second stochastic screen in areas within the watermark, where the second stochastic screen is multi-partitioned and at least one partition is orthogonal to a partition of the first screen.

U.S. Pat. No. 7,286,685 (Brunk et al.) embed a watermark by modifying the threshold of an error diffusion process when screening an image. Brunk et al. embed the watermark in the error signal of the printed image.

It is known that the surface roughness of the receiver influences the amount of ink transferred. Walker and Fetsko, "A Concept of Ink Transfer", American Ink Maker, December 1955, show that ink transfer is a function of absorption into paper and splitting of the remaining ink. These characteristics vary as a function of the surface roughness of the receiver as shown by their FIG. 2.

There is a need to be able to embed data in printed images. Ideally the method should not be easily discernable by eye. A method which hides information in halftone dots while minimally modifying the printed halftone pattern are advantaged over techniques that are easily visible, or increase the visible density error, or shift the halftone dots such that they are out of register with subsequent colors.

SUMMARY OF THE INVENTION

Briefly, according to one aspect of the present invention, data is embedded into printed halftone images by modifying the surface of a plurality of halftone dots on a relief printing plate. The embedded data may be human readable or machine readable. The embedded data may be encrypted, hidden, or camouflaged. The embedded data may be difficult to copy.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art. FIGS. 1a through 6b are considered prior art. FIGS. 4a through 6b use a patterned surface as described by U.S. Publication No. 2010/0143841 (Stolt et al.).

Figure 1B:
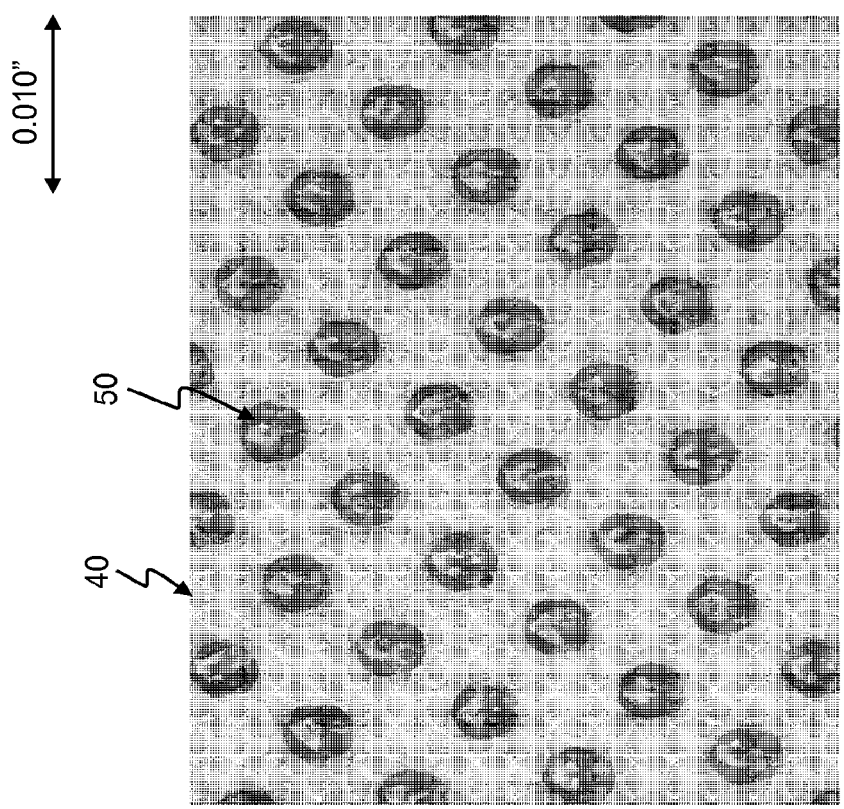
FIG. 1b is a prior art magnified image of a printed 10%, 150 dpi, 45°, tint.
Figure 1A:
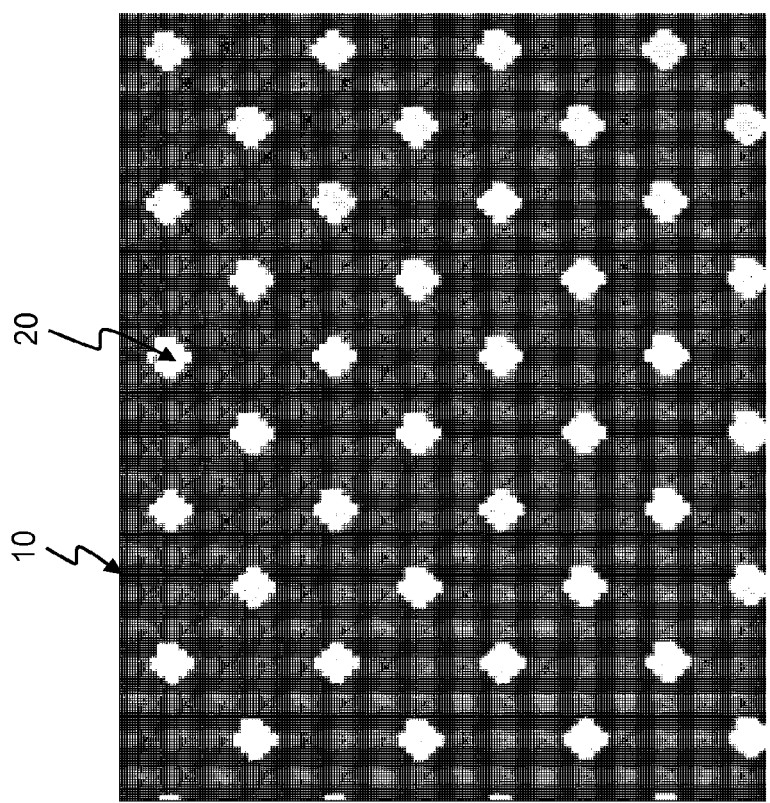
FIG. 1a is a prior art magnified image of a relief plate for a 10%, 150 dpi, 45°, tint.

Referring now to FIG. 1a item 10 is a magnified image of a relief plate in the area of a 10% tint. Item 20 is the top surface of a single 10% dot. FIG. 1b item 40 is an image of a relief print created as a flexographic print using solvent based black ink printed onto a white polymer receiver using a relief plate with a 10% tint. Item 50 is a prior art printed dot consisting of a 10% tint printed onto the white poly receiver. The relief plate may be a flexographic printing plate such as a KODAK FLEXCEL NX Plate. KODAK and FLEXCEL are trademarks of the Eastman Kodak Company.

Figure 2B:
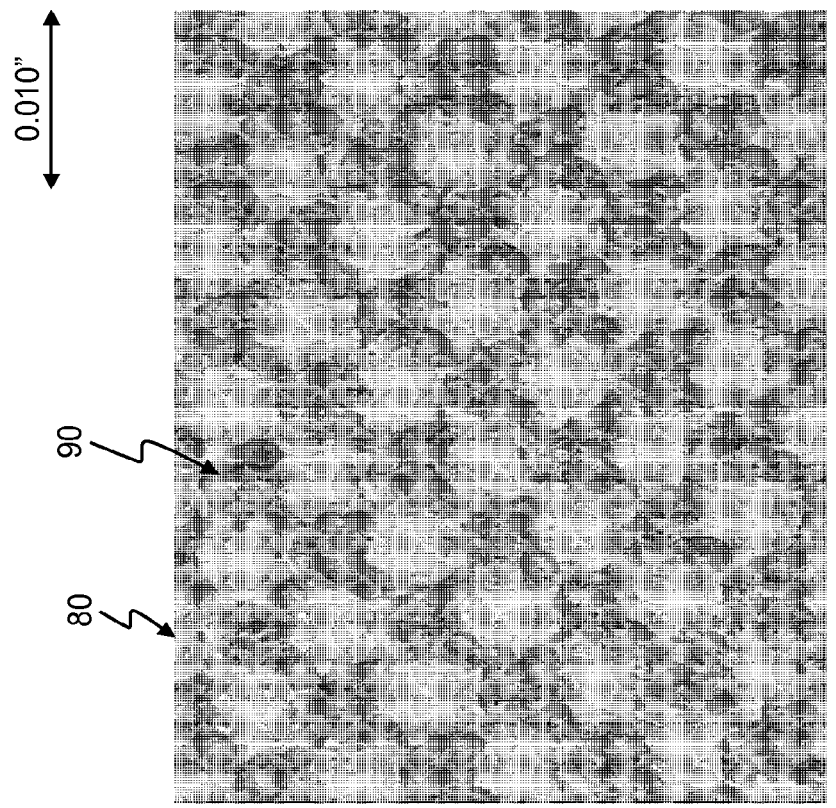
FIG. 2b is a prior art magnified image of a printed 50%, 150 dpi, 45°, tint.
Figure 2A:
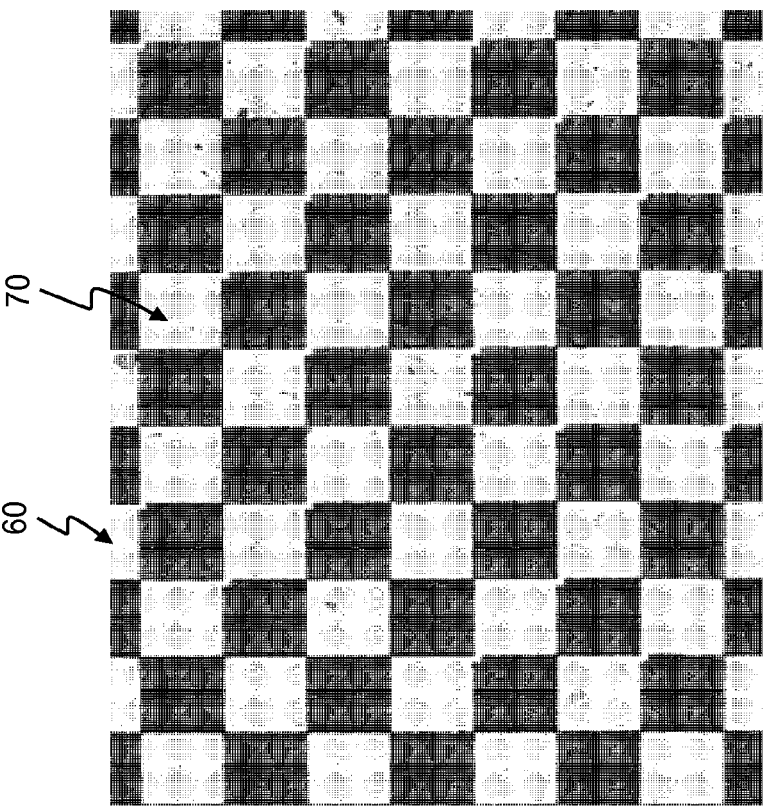
FIG. 2a is a prior art magnified image of a relief plate for a 50%, 150 dpi, 45°, tint.

FIG. 2a item 60 is a magnified image of a relief plate in the area of a 50% tint. Item 70 is the top surface of a single 50% dot. FIG. 2b item 80 is an image of a relief print created as a flexographic print, printed using solvent based black ink onto a white polymer receiver using a relief plate with a 50% tint. Item 90 is a prior art printed dot consisting of a 50% tint printed onto the white poly receiver.

Figure 3B:
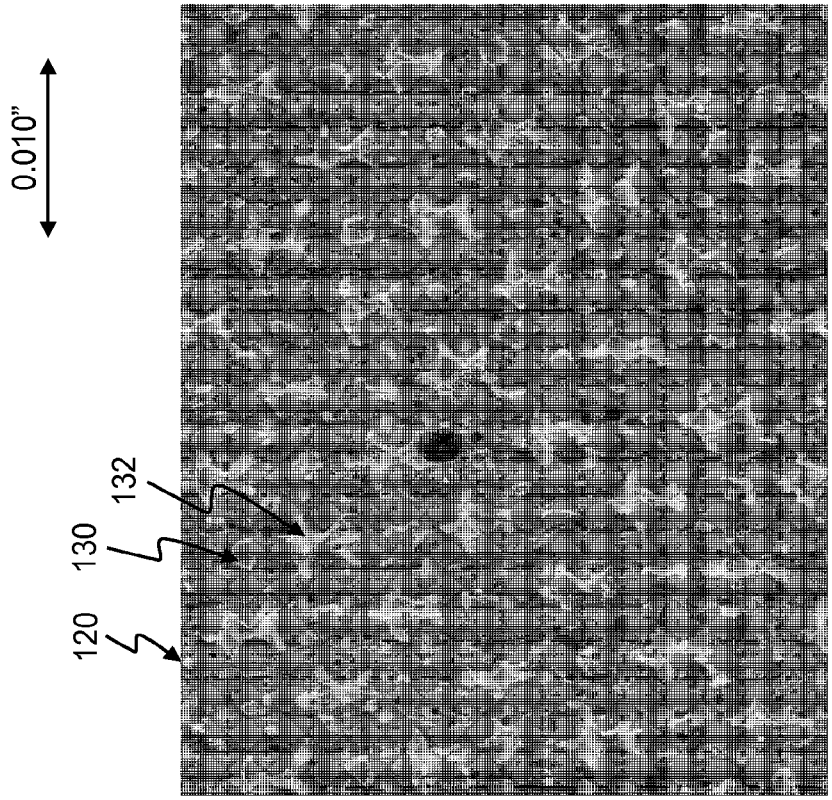
FIG. 3b is a prior art magnified image of a printed 80%, 150 dpi, 45°, tint.
Figure 3A:
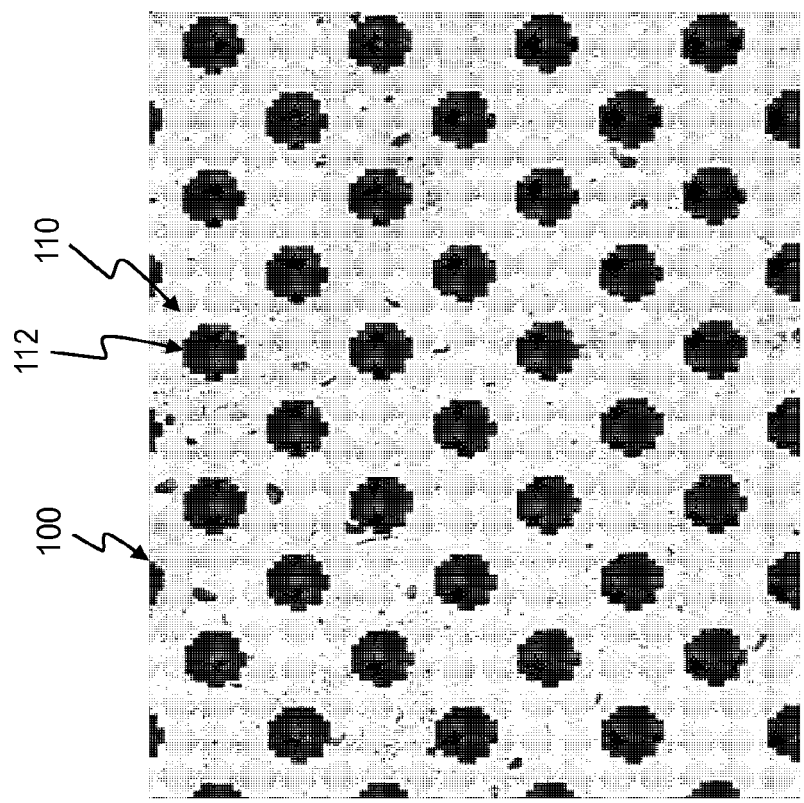
FIG. 3a is a prior art magnified image of a relief plate for a 80%, 150 dpi, 45°, tint.

FIG. 3a item 100 is a magnified image of a relief plate in the area of an 80% tint. Item 110 is the top surface of an 80% dot. Item 112 is the hole representing the center of the 80% halftone dot. FIG. 3b item 120 is an image of a relief print created as a flexographic print, printed using solvent based black ink onto a white polymer receiver using a FLEXCEL NX Plate with an 80% tint. Item 132 is a prior art printed hole for an 80% tint on white poly receiver. The printed ink around the 80% hole is shown as item 130.

Figure 4B:
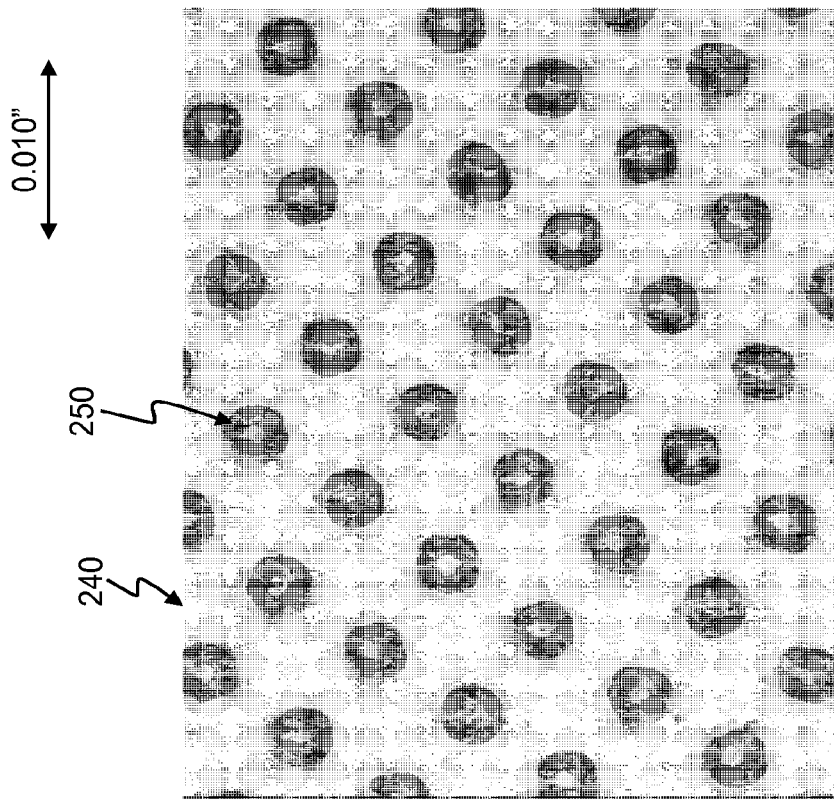
FIG. 4b is a magnified image of a prior art printed 10%, 150 dpi, 45°, tint using a relief plate with a patterned surface.
Figure 4A:
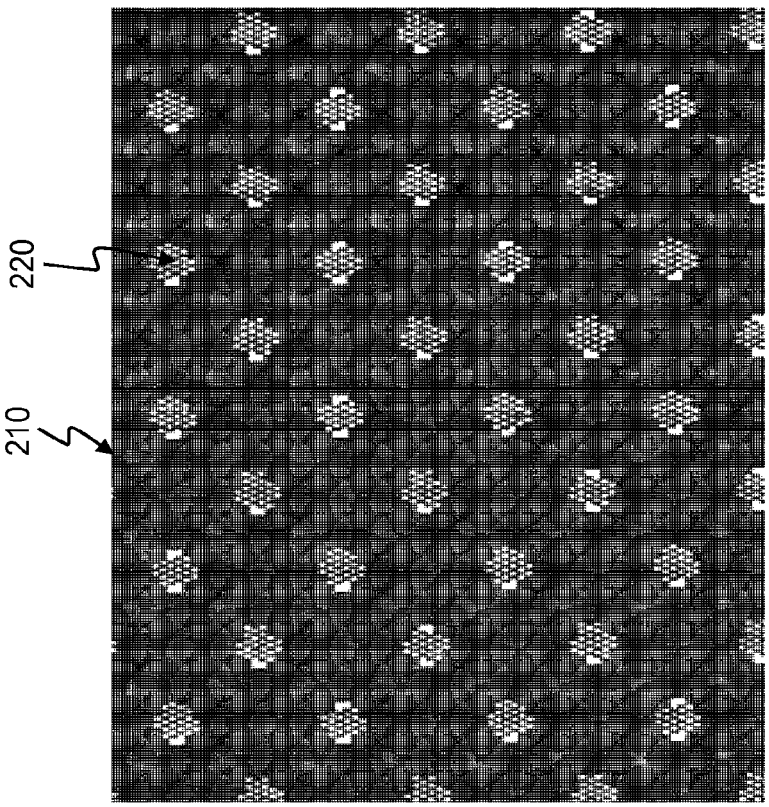
FIG. 4a is a magnified image of a prior art relief plate with a patterned surface of a 10%, 150 dpi, 45°, tint.

Referring now to FIG. 4a item 210 is a magnified image of a relief plate containing a surface pattern on 10% tints. Item 220 is the top patterned surface of a single 10% surface patterned dot. FIG. 4b item 240 is an image of a relief print printed with flexography using a solvent based black ink onto a white polymer receiver with a relief plate containing a surface patterned 10% tint. Item 250 is a prior art 10% printed dot, printed with a surface pattern on the relief plate onto the white poly receiver. The relief plate containing a surface pattern may be a flexographic printing plate such as a KODAK FLEXCEL NX Plate with Kodak DigiCap Advanced Screening Technology.

Figure 5B:
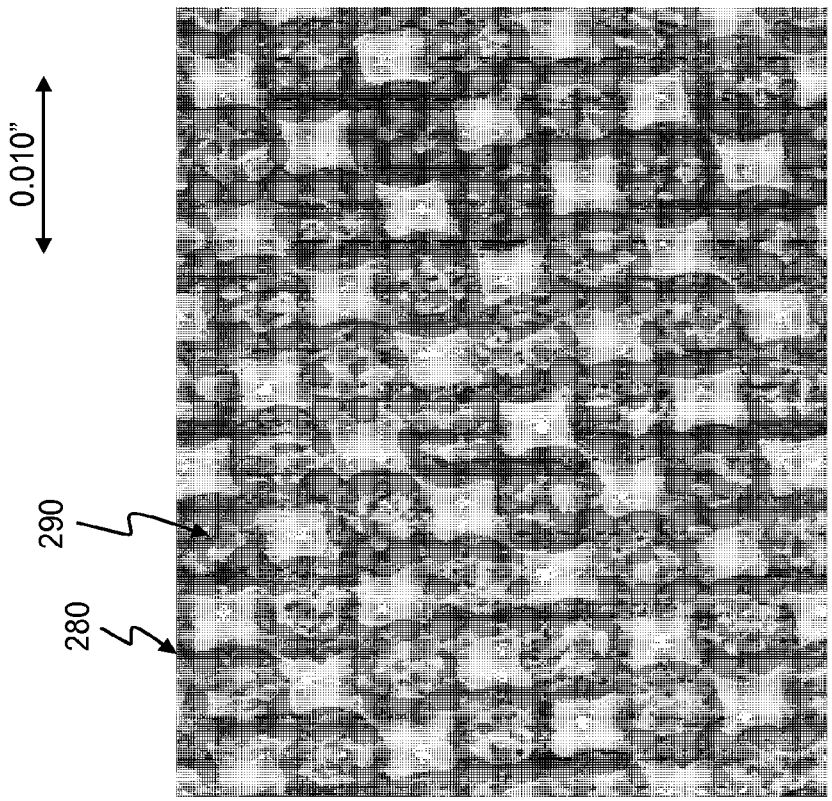
FIG. 5b is a magnified image of a prior art printed 50%, 150 dpi, 45°, tint using a relief plate with a patterned surface.
Figure 5A:
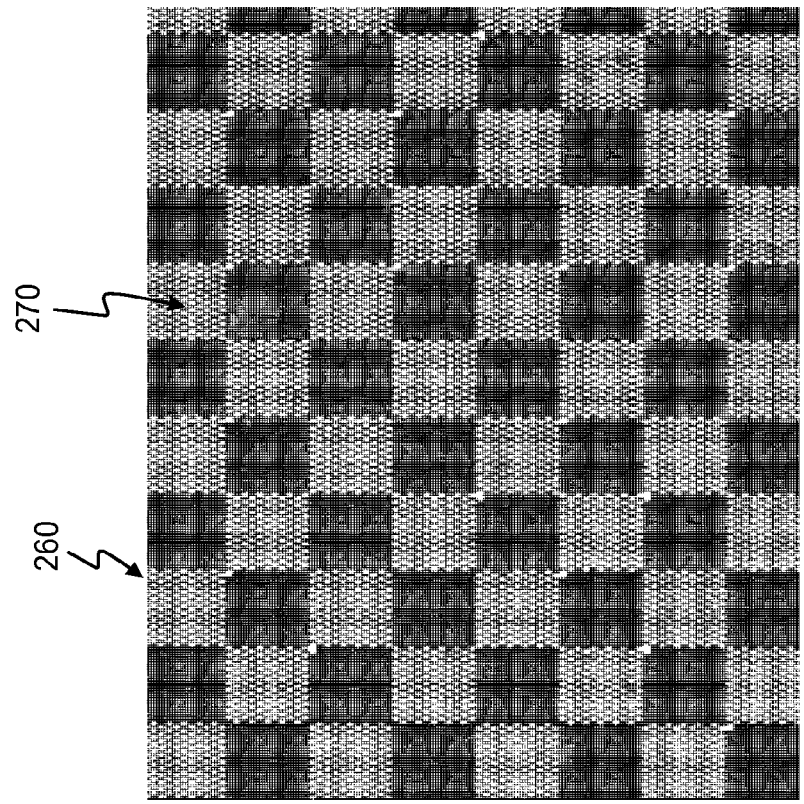
FIG. 5a is a magnified image of a prior art relief plate with a patterned surface of a 50%, 150 dpi, 45°, tint.

FIG. 5a item 260 is a magnified image of a relief plate containing a surface pattern on a 50% tint. Item 270 is the top patterned surface of a single 50% surface patterned dot. FIG. 5b item 280 is an image of a relief print printed with flexography using solvent based black ink onto a white polymer receiver using a relief plate with a 50% tint containing a surface pattern. Item 290 is a prior art 50% printed dot, printed with a surface pattern on the relief plate onto the white poly receiver.

Figure 6B:
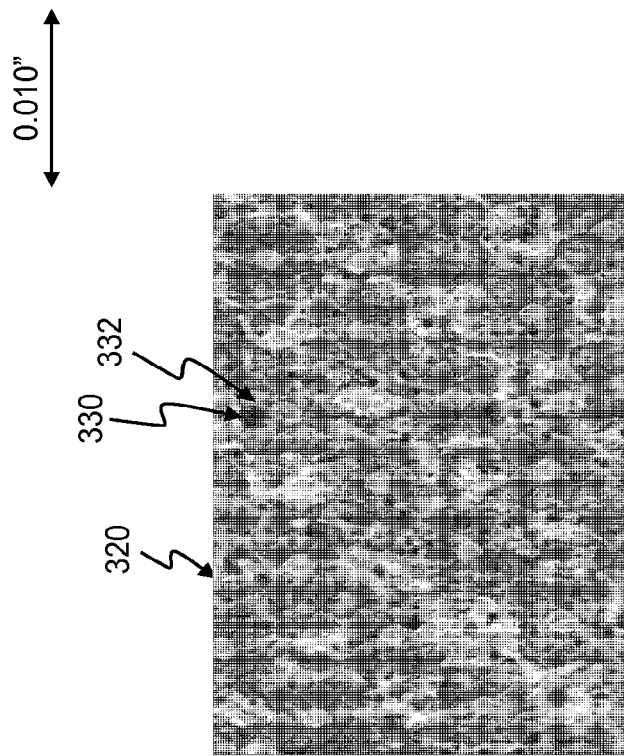
FIG. 6b is a magnified image of a prior art printed 80%, 150 dpi, 45°, tint using a relief plate with a patterned surface.
Figure 6A:
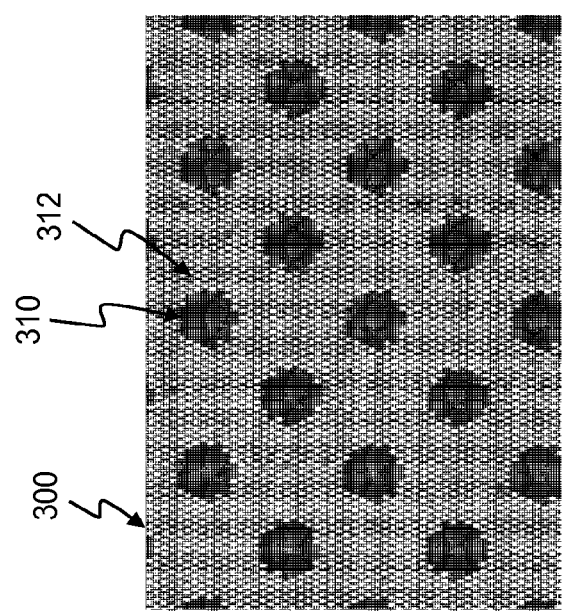
FIG. 6a is a magnified image of a prior art relief plate with a patterned surface of an 80%, 150 dpi, 45°, tint.

FIG. 6a item 300 is a magnified image of a relief plate containing a surface pattern on an 80% tint. Item 310 is the top patterned surface of an 80% dot surrounding a hole 112. Item 312 is the hole representing the center of the halftone dot. FIG. 6b item 320 is an image of a relief print printed with flexography using solvent based black ink onto a white polymer receiver using a relief plate with an 80% tint containing a surface pattern. Item 332 is a prior art 80% hole on the white poly receiver. The printed ink around the 80% hole is shown as item 330.

Figure 7B:
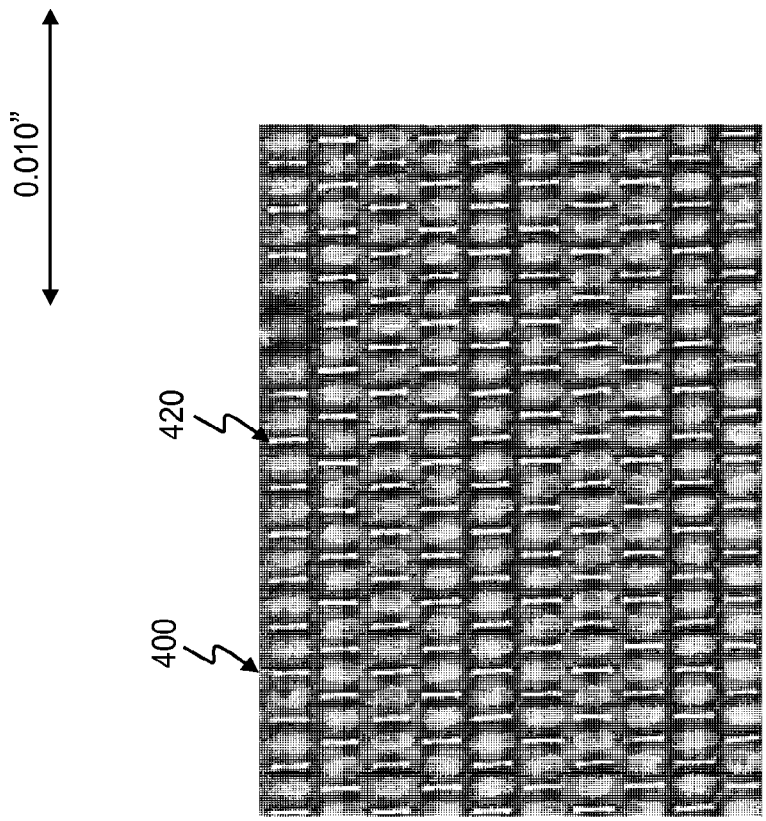
FIG. 7b is a magnified image of a prior art relief plate with a patterned surface of a 100% tint, focused 6 um below the top surface.
Figure 7A:
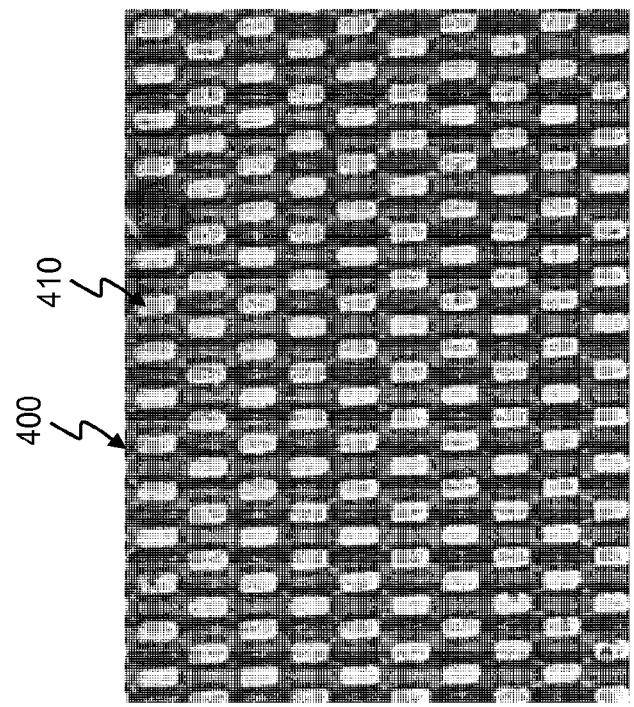
FIG. 7a is a magnified image of a prior art relief plate with a patterned surface of a 100% tint, focused at the top surface.

FIG. 7a item 400 is a relief plate containing a surface pattern on a 100% tint with the top patterned surface shown as item 410. FIG. 7b shows the relief plate with surface pattern, 400, focused 6 um below the surface. The depth of the surface pattern at 420 is less than 30 um and preferably less than 10 um and more preferably around 6 um as shown in FIG. 7b. The top patterned surface 410 is nominally 5 um wide by 10 um tall with the surface pattern 420 being nominally 5 um wide by 10 um tall. Preferably the surface pattern consists of pits in the surface with each pit being less than 30 um wide by 30 um tall. More preferably the surface pattern pits are on the order of 10 um by 10 um, and most preferably the surface pattern is 5 um by 10 um. It is also preferable to have the roughened surface consisting of holes or pits that are connected together giving air or other gasses room to move from pit to pit as the relief plate is compressed while inking and printing. The pits may be round, square, or an easily created shape. The surface of the relief member may be roughened by creating an opaque feature in a mask which is used during the exposure of a photo-sensitive relief member precursor. The surface of the relief member may be roughened by etching the surface. The surface of the relief member may be roughened by laser ablating the surface. The surface of the relief member may be roughed by chemically processing the surface. The surface of the relief member may be roughened by machining the surface.

Figure 8:
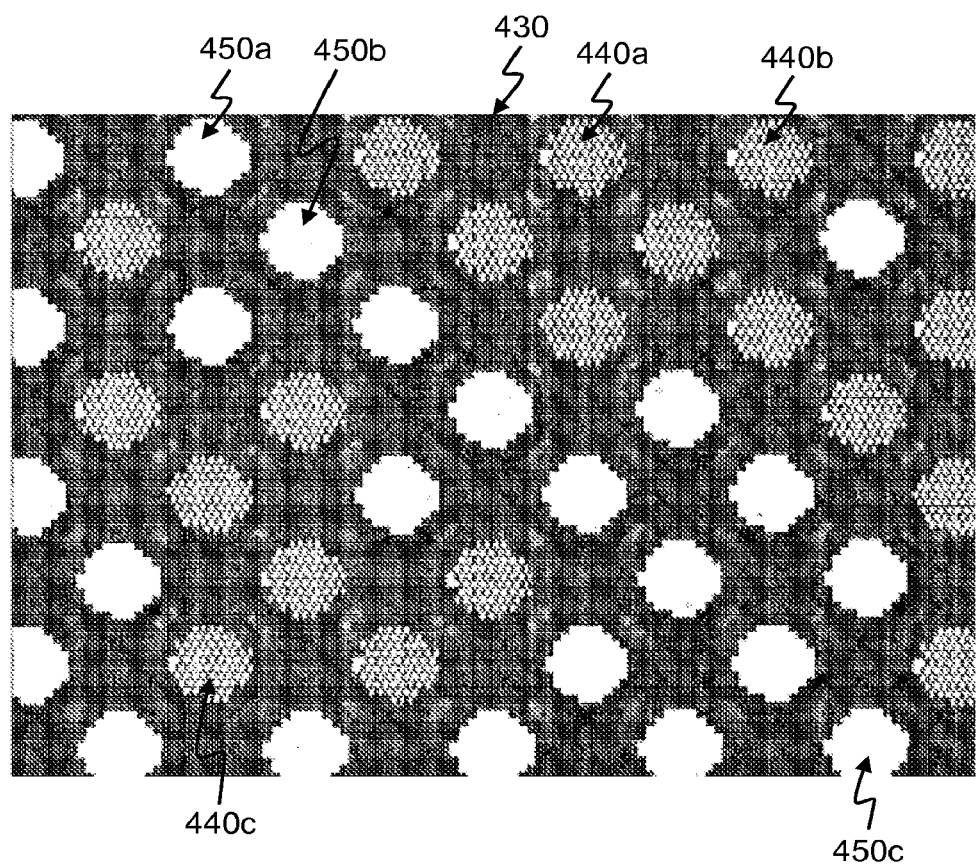
FIG. 8 is a simulated embodiment of the present invention.

Referring now to FIG. 8 item 430 is a simulated relief plate embodiment of the present invention. A relief plate 430 with halftone dots composed of a first surface pattern 450a-450c, and halftone dots composed of a second surface pattern 440a-440c. Embedded data, (not shown), is used to modulate the surfaces of the halftone dots. Encryption techniques and communication techniques such as run length encoding, data compression, non return to zero encoding, etc. may be used to determine which halftone dots to print with a first surface pattern, 450a-450c, and which halftone dots to print with a second surface pattern, 440a-440c, using the embedded data. For conveying a large amount of data, address bits and error correction bits may be embedded within the encoding. In addition the encoding may be repeated over local areas to make it easier to detect.

Figure 9:
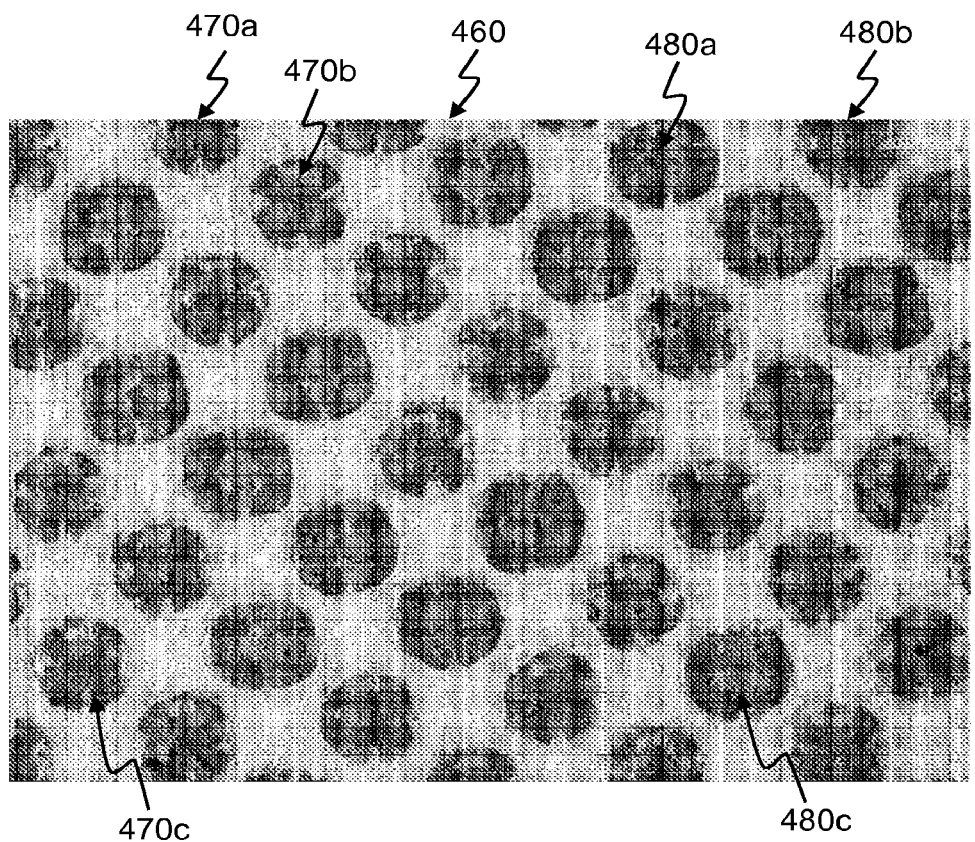
FIG. 9 is a simulated print using the present invention.

FIG. 9 is a simulation of a print, 460, printed with the relief plate embodiment of the present invention, 430. Halftone dots printed with a first surface pattern, 450a-450c, are shown as items 470a-470c. Halftone dots printed with a second surface pattern, 440, are shown as items 480a-480c.

Figure 10:
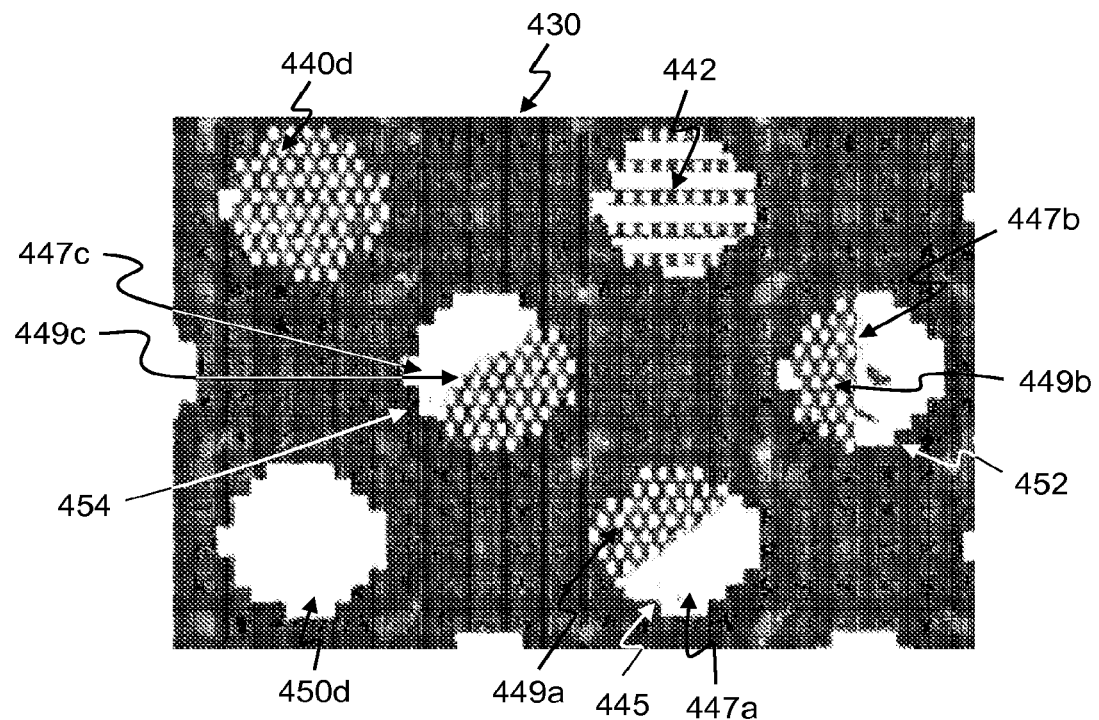
FIG. 10 is a simulated embodiment of the present invention.

Referring to FIG. 10, item 430 is a simulated embodiment of the present invention consisting of halftone dots with a first surface pattern, 450d; halftone dots with a second surface pattern 440d; halftone dots with a third surface pattern 442; and halftone dots composed of two surface patterns 445, 452, and 454. Halftone dot 445 is composed of a first surface pattern in a first orientation 447a and a second surface pattern in a first orientation 449a. Halftone dot with two surface patterns, 452, is composed of a first surface pattern in a second orientation 447b and a second surface pattern in a second orientation 449b. Halftone dot with two surface patterns, 454, is composed of a first surface pattern in a third orientation 447c and a second surface pattern in a third orientation 449c. Multiple surface patterns may be created to create halftone dots with multiple print outputs resulting in more than two bits of encoded data per halftone dot. One skilled in the art will recognize that additional surface patterns may be used for each halftone dot. One skilled in the art will recognize that surface patterns may be rotated to encode additional information.

One skilled in the art will recognize that as the percent tint level decreases the area of the halftone dot decreases and it will be more difficult to detect the modulated data. Also the addition of a surface pattern will have a greater impact on the overall ink transferred and therefore the tonescale of the image as the percent tint level decreases to zero. Modulated data may be encoded using surface roughening features for halftone tints greater than 0% and less than 100%. More preferably one applies modulated data to tints between 5% and less than 100%, and most preferably one applies modulated data to halftone tints between 10% and less than 100%.

Figure 11:
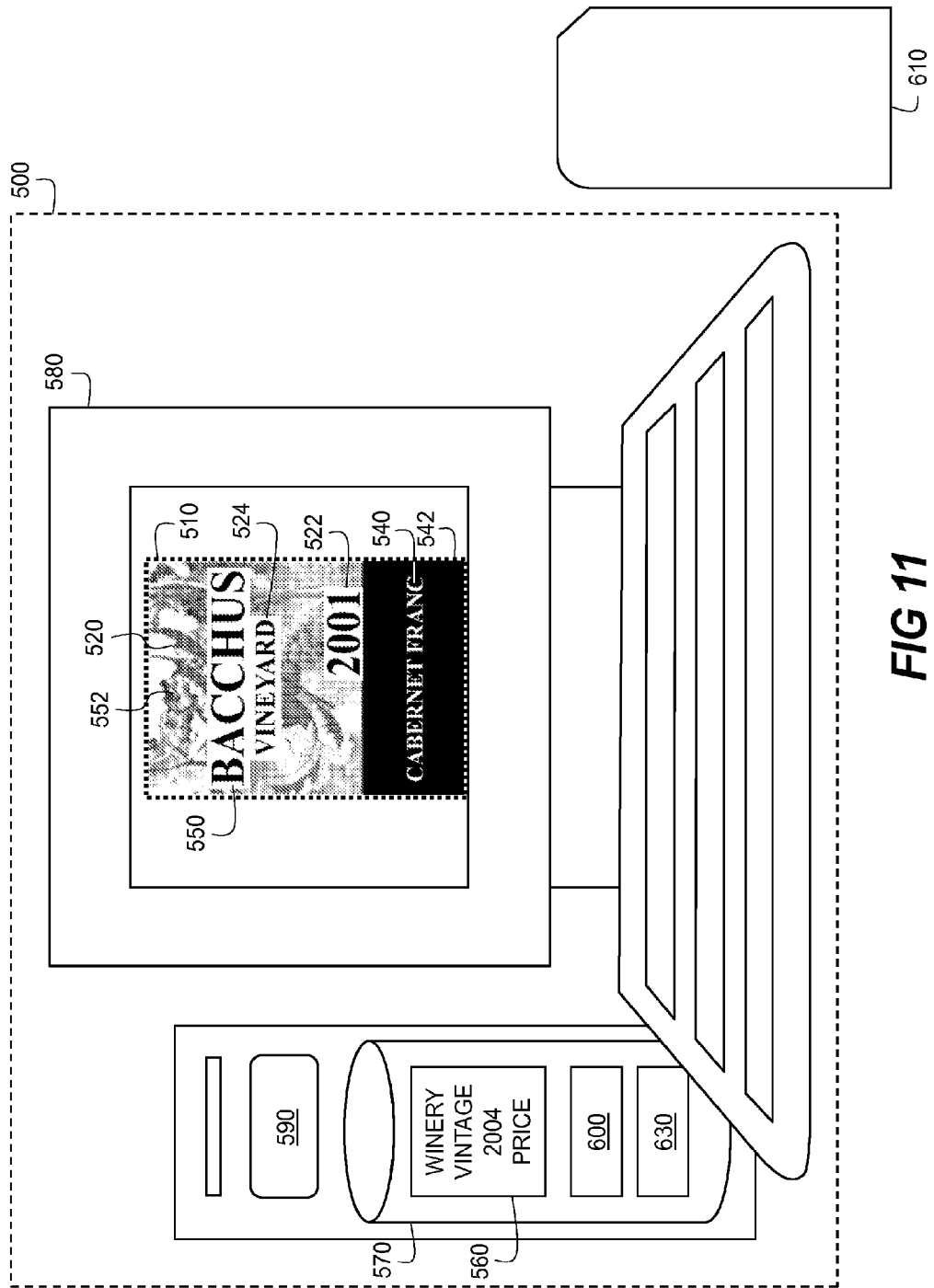
FIG. 11 is a schematic illustrating an embodiment of the present invention.

Referring to FIG. 11, workstation 500 contains customer artwork 510 comprising numerous objects including; solid area 542, reverse text 540, background halftone image 552, linework 520, text 522, text 524, and text 550.

A first method of printing the customer artwork 510 uses a single color ink to print solid image features consisting of solid area 542 and text 550. Then background image 552 is screened using an amplitude modulated halftone screen while linework 520, text 524, and text 522 are screened at a second % tint darker than the first % tint. This results in screened text characters for text 522 and text 524, plus screened lines on linework 520, all on top of screened halftone background image 522. Screened text and screened lines may show jagged edges and may be objectionable to the customer. The invention is used to modify the screened images 522, 524, 520, and 552 with embedded data 560 to be encoded.

The image processor 590 contains a raster image processor to convert the screened text, lines, and images into halftone bitmap files 600. Then the embedded data 560 to be encoded is used to modulate the halftone dots of a halftone screened text 522, screened text 524, screened lines 520, or screened background image 552. Individual halftone dots are either printed with a solid plate surface (FIG. 8 item 450) or a textured plate surface (FIG. 8 item 440) to represent a binary zero or a one. The embedded data 560 may be encoded as binary data or binary ASCII data, The modified halftone dots and the original halftone bitmap files 600 are combined into a modified bitmap 630.

Alternatively, the image processor 590 contains a raster image processor to convert the screened text, lines, and images into a halftone bitmap file 600. The embedded data 560 to be encoded is used to modulate the halftone dots of a halftone screened text 522, screened text 524, screened lines 520, or screened background image 552. The embedded data 560 is encoded as digital base 3 numbers. Individual halftone dots are then printed with either a solid plate surface to represent a zero (FIG. 10 item 450), a second surface pattern (FIG. 10 item 440d) to represent a one, or a third surface pattern (FIG. 10 item 442) to represent a two. The modified halftone dots and the original halftone bitmap files 600 are combined into a modified bitmap 630.

One skilled in the art will recognize that additional surface relief patterns may be used to encode data using higher order bases. One skilled in the art will recognize that each screened feature may encode a copy of all of the embedded data or a unique embedded data element. Replicate copies of all of the embedded data may make it easier to detect while unique encodings of each embedded data element allows one to store more data in the print.

A second method of printing customer artwork 510 uses two inks having different color. Solid image features comprising solid area 542 and text 550 are imaged as solid image features with a first color ink. Solid image features comprising image linework 520, text 522, and text 524, are printed with a second color ink also as solid objects. Background halftone image 552 is screened using either the first or second color inks or a combination of both. The invention is used to modify screened halftone background image features 552 to contain embedded data.

One skilled in the art will recognize that first and second colored inks may all be of the same hue with different amounts of intensity. In addition all inks may be different levels of black or grey. For purposes of this invention black, white and grey inks are considered to be colors. The customer artwork may be printed onto receivers comprising uncoated paper, coated paper, colored paper, metal, polymer, glass, ceramic, hard board, wood, corrugated board, label stock, or other receiver.

One skilled in the art will recognize that the intensity and density of the ink used to print a screened text, linework, or graphics item, may be selected to be a darker color such that the screened tint falls in the range greater than 0% and less than 50% such that the halftone dots are non-overlapping and easy to detect. More preferably the tint falls between 5% and less than 45% and most preferably the tint falls between 10% and 30%.

The data to be encoded 560 may be stored on storage device 570 on workstation 500. Storage devices may be hard disks, random access memory, floppy media, compact disk, network storage devices, solid state disk, or other data storage devices. The customer artwork 510 may also be stored on storage device 570 or displayed on monitor 580. Workstation 500 also contains an image processor 590 which converts customer artwork 510 into bitmap files 600 for each color to be printed at the writing resolution of the film writer 610. In addition the image processor encodes the embedded data 560 to be encoded to fit into the halftone screened image features comprising at least one background image 552, screened text 150, screened linework 120, screened text 122, or screen text 124, creating a modified bitmap 630. Modified bitmap 630 contains the original bitmap 600 with the encoded data. The image processor creates a modified bitmap 630 for each of the colors to be printed in the customer artwork 510. The data to be encoded may be encoded into any areas consisting of halftone screens, including image areas, or screened artwork such as screened text, screened linework, and screened graphics.

One skilled in the art will recognize that solid printed features may be encoded with surface patterns on the relief plate using the commonly-assigned copending U.S. patent application Ser. No. 13/017,260, filed Jan. 31, 2011 (Sanger). By combining both inventions encoded data may be encoded onto both solid and halftone areas of the print.

Figure 12:
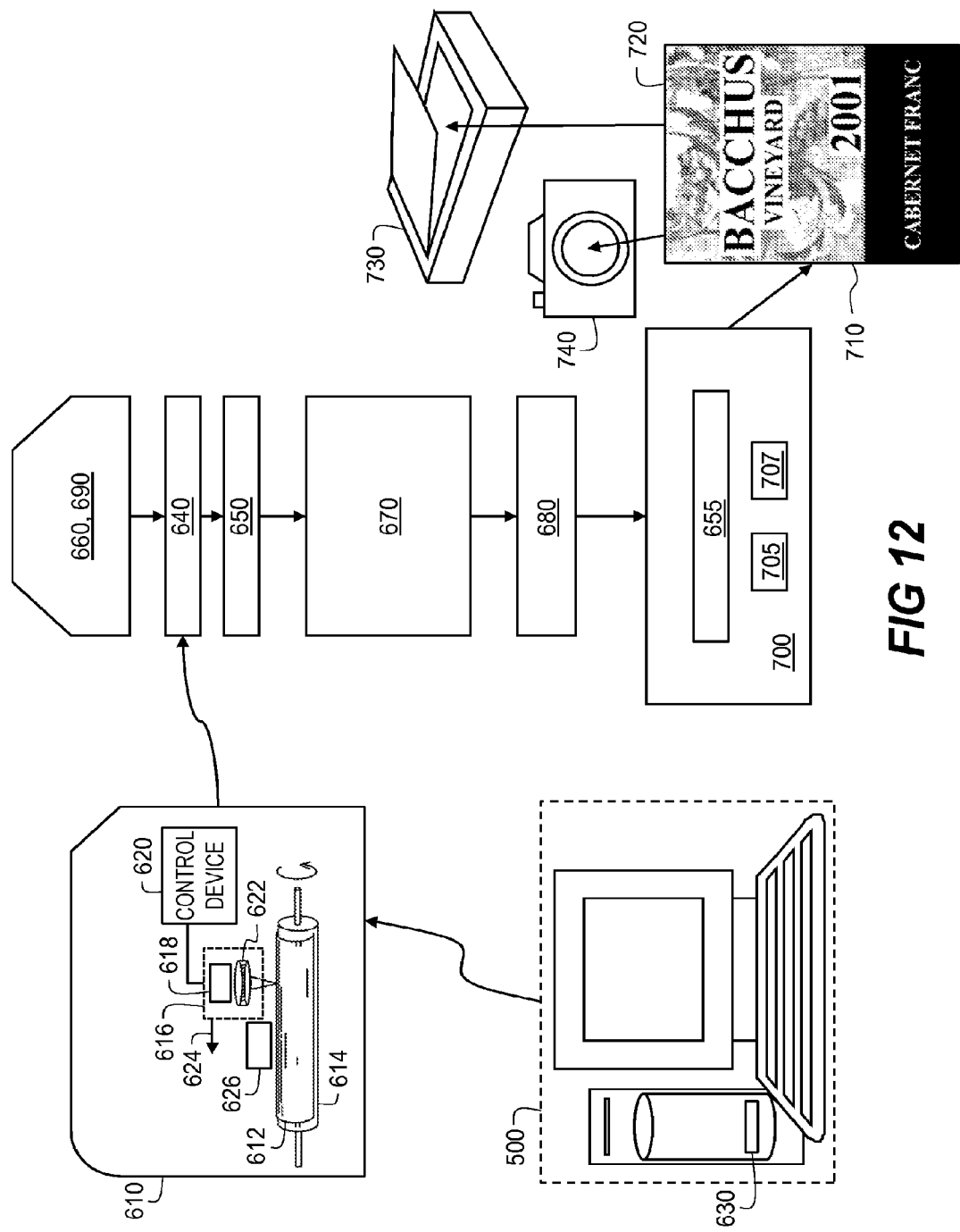
FIG. 12 is a schematic illustrating an embodiment of the present invention.

Referring to FIG. 12, the workstation 500 then sends the modified bitmap 630 to the control device 620 of a film writer 610 which is used to create a mask 640. The control device 620 controls a laser 618 using the modified bitmap 630 which is imaged through a lens 622 onto a film 612 to create mask 640. The film 612 is mounted on a rotating drum 614. The laser 618 and lens 622 compose a print head 616 which translates in a translation direction 624 in combination with the spinning drum 614 in order to write the film 612 to create the written mask 640. Debris may be collected during the writing process with a vacuum head 626.

The written mask 640 is affixed to an unexposed relief printing member precursor 650. The precursor 650 is then exposed to actinic radiation 660 and the mask 640 is removed. The exposed precursor 650 is then processed in a processor 670, baked in an oven 680, and then post cured using additional actinic radiation 690 forming a relief printing member 655.

For example the written mask may be a KODAK FLEXCEL NX Thermal Imaging Layer written using a KODAK FLEXCEL NX Imager. The mask is laminated to the KODAK FLEXCEL NX Plate and exposed using UVA light from a Mekrom EDLF 3658 exposure, light finisher, and dryer device. The plate may be processed using a Mekrom Processor 3648 automatic flowline processor for solvent washable flexographic solid plates.

One skilled in the art will recognize various well-known alternate means of modifying the relief printing member within the scope of the present invention. Optionally, the film may be integral with the relief member precursor prior to the writing of the mask. Alternatively, the mask may be affixed by lamination or by vacuum holder or may be loose. Alternatively, the precursor may be exposed by projection through the mask and a lens system. The mask may be imaged by ablating a film with a laser or a thermal head. A mask may be generated on a relief printing member precursor or carrier substrate by thermal dye transfer or by inkjet.

Alternatively the film writer 610 and mask 640 may be substituted with a direct writing system in which the modified bitmap is directly written to a photosensitive relief printing precursor with actinic radiation or the modified bitmap is used to control a direct laser engraver that creates relief on a relief printing member by ablation.

Flexographic relief printing member 655 contains a relief image for one of the colors in customer artwork 510 along with embedded data 560 which is encoded in the solid surface of the relief printing member 655. The relief printing member 655 is mounted into a flexographic printing press 700. Ink 705 is applied to the relief printing member and then transferred to a receiver 707 to produce the customer artwork 510 onto printed stock resulting in a printed piece 710. The printed piece contains at least one halftone screened feature with embedded data 720. The at least one halftone screened feature may be a screened image, a screened text, a screened linework, or screened graphics item.

A camera 740 or a page scanner 730 may be used to capture an image of the printed piece 710 with embedded data 720. A camera attached to a microscope may be used to capture the printed halftone image with embedded data. A second image processor, not shown, may be used to process the scanned image, decode the embedded data, and present it to a customer, user, manufacturer, supplier, or publisher.

Relief printing members may be flexographic printing plates, flexographic printing sleeves with an integral relief plate, flexographic printing sleeves with a removable relief plate, flexographic printing cylinders with an integral relief plate, flexographic printing cylinders with a removable relief plate, rubber stamps, or rubber molds or other relief printing members used to transfer ink to a receiver.

Relief printing members may be created by engraving with a laser, wherein the image processor creates a bitmap of the customer artwork at the writing resolution of the laser engraver, the embedded data is embedded into the solid image features within the bitmap, and the laser engraver uses the bitmap to engrave the relief printing member. The laser engraver may be a direct write plate writer.

Figure 13:
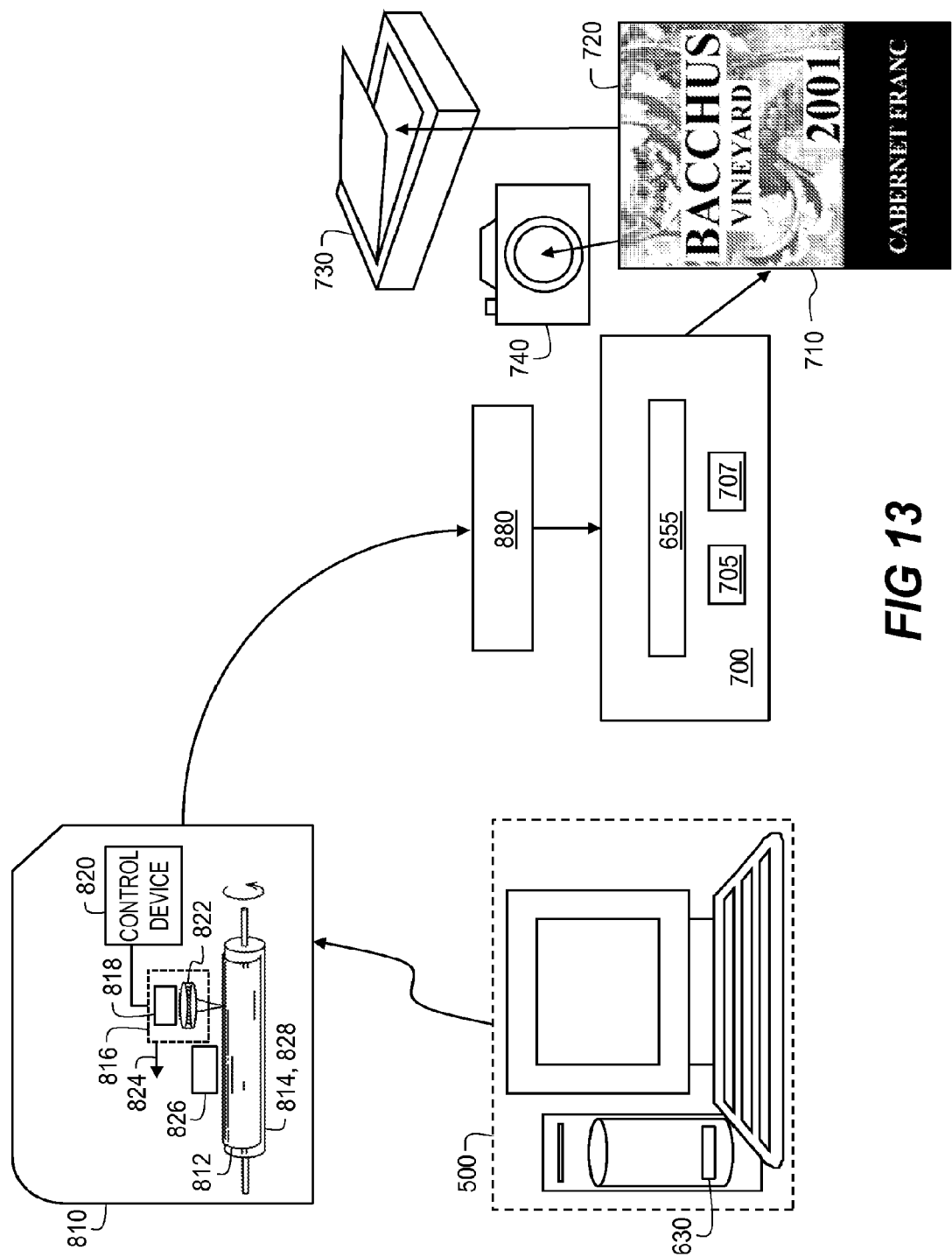
FIG. 13 is a schematic illustrating an embodiment of the present invention.

Referring to FIG. 13, the workstation 500 sends the modified bitmap 630 to the control device 820 of a laser engraver 810 which is used to create a direct write relief member 855. The control device 820 controls a laser 818 using the modified bitmap 630 which is imaged through a lens 822 onto the direct write relief member precursor 812. The direct write relief member precursor 812 may be mounted onto a drum 814. The direct write plate precursor 812 may be coated onto the drum 814. Or the direct write plate precursor 812 may be coated or mounted onto a sleeve 828 which is mounted onto the drum 814. The laser 818 and lens 822 compose a print head 816 which translates in a translation direction 824 in combination with the spinning drum 814 in order to write the plate precursor 812 to create the direct write relief member 855. Debris is collected with a vacuum collection head 826. The direct write relief member 855 may be post processed by washing or scrubbing to remove debris in processor 880. The relief printing member 855 is mounted into a flexographic printing press 700. Ink 705 is applied to the relief printing member and then transferred to a receiver 707 to produce the customer artwork 510 onto printed stock resulting in a printed piece 710. The printed piece contains at least one halftone screened feature with embedded data 720. The at least one halftone screened feature may be a screened image, a screened text, a screened linework, or screened graphics item.

Relief printing members may be created by ablating an integral laser ablation mask wherein the image processor creates a bitmap of the customer artwork at the writing resolution of the laser ablation mask writer and the embedded data is embedded into the solid image features within the bitmap, and the laser ablation mask writer uses the bitmap to ablate the mask of the relief printing member. Subsequently, the relief printing precursor comprising the imagewise ablated integral mask is exposed to curing radiation through the mask and processed to remove the mask and uncured material.

The encoded data may be detected by scanning the print with a scanner, a camera, a camera phone, a microscope, a camera with a macro lens, a microscope with a camera, by eye, or visually with magnification. The encoded data may be detected by moving the print past a line scanning device. The encoded data may be detected by capturing an image of the print with an area detection device. Once an image of the print has been captured, the halftone dots may be evaluated to determine if there is encoded data by looking at the density variability or noise within the dot. Screened text, screened linework, or screened image features may be recognized and evaluated to determine if the density distribution within a dot follows or matches known profiles.

For example capture an image of encoded halftone dots using a PIAS™-II manufactured by Quality Engineering Associates (QEA) Inc., 755 Middlesex Turnpike, Unit 3, Billerica, Mass. 01821. Threshold the image to detect the inked areas of the captured image. Perform a 2D Fast Fourier Transform (2D FFT). Detect the screen frequency and screen angle. For each local area, consisting of an area about 5 halftone dots wide by 5 halftone dots tall, perform a local 2D FFT to determine the halftone dot phase. Using an aperture slightly larger than a halftone dot on the local area, position the aperture on each dot, measure the dot % tint, and perform a 2D Correlation between the apertured dot and the corresponding known dots at that percent tint with and without surface patterns. For each dot record the surface pattern and orientation of the surface pattern used. Use the recorded surface pattern information as the encoded data. Repeat over a new local area until the whole print has been decoded.

It is an advantage of the present invention that embedded data is embedded in halftone dots by modifying the surface of a relief printing member. The present invention uses the fact that ink transfer and therefore printed density varies by the roughness of the receiver, by modulating the perceived roughness using the surface of the relief member or plate. This modulation results in a non-binary printing method imposed onto each halftone dot. The present invention is advantaged as this modulation does not significantly affect the size, shape, orientation, or dot gain of the halftone dot.

The invention has been described in detail with particular reference to certain preferred embodiments thereof, but it will be understood that variations and modifications can be effected within the scope of the invention.

PARTS LIST 10 relief plate
20 top surface
40 relief print
50 printed dot
60 relief plate
70 top surface
80 relief print
90 printed dot
100 relief plate
110 top surface
112 hole
120 relief print
130 printed ink
132 printed hole
210 relief plate with surface pattern
220 top patterned surface
240 relief print
250 printed dot
260 relief plate with surface pattern
270 top patterned surface
280 relief print
290 printed dot
300 relief plate with surface pattern
310 top patterned surface
312 hole
320 relief print
332 hole
330 printed ink
400 relief plate with surface pattern
410 top patterned surface
420 bottom of surface pattern
430 relief plate
440a halftone dots with second surface pattern
440b halftone dots with second surface pattern
440c halftone dots with second surface pattern
440d halftone dots with second surface pattern
442 halftone dots with third surface pattern
445 halftone dot with two surface patterns
447a first surface pattern in a first orientation
447b first surface pattern in a second orientation
447c first surface pattern in a third orientation
449a second surface pattern in a first orientation
449b second surface pattern in a second orientation
449c second surface pattern in a third orientation
450a halftone dots with first surface pattern
450b halftone dots with first surface pattern
450c halftone dots with first surface pattern
450d halftone dots with first surface pattern
452 halftone dot with two surface patterns
454 halftone dot with two surface patterns
460 print
470a halftone dots printed with first surface pattern
470b halftone dots printed with first surface pattern
470c halftone dots printed with first surface pattern
480a halftone dots printed with second surface pattern
480b halftone dots printed with second surface pattern
480c halftone dots printed with second surface pattern
500 workstation
510 customer artwork
520 linework
522 text
524 text
540 reverse text
542 solid area
550 text
552 background halftone image
560 embedded data
570 storage device
580 monitor
590 image processor
600 bitmap files
610 film writer
612 film
614 drum
616 print head
618 laser
620 control device
622 lens
624 translation direction
626 vacuum head
630 modified bitmap
640 mask
650 relief printing member precursor
655 relief printing member
660 actinic radiation
670 processor
680 oven
690 actinic radiation
700 printing press
705 ink
707 receiver
710 printed piece
720 halftone screened feature with embedded data
730 page scanner
740 camera
810 laser engraver
812 direct write relief member precursor
814. drum

816. print head
818 laser
820 control device
822 lens
824 translation direction
826 vacuum head
828 sleeve
855 direct write relief member
880 processor

The invention claimed is:

1. A method of embedding data in printed halftone image features on a receiver comprising:
   providing a relief printing member;
   encoding first embedded data in the relief printing member by modifying surfaces of a first plurality of halftone dots;
   printing the halftone image on the receiver;
   creating a modified bitmap comprising the encoded data within the first plurality of halftone dots;
   creating a mask with the modified bitmap;
   exposing the relief printing member through the mask; and
   processing the relief printing member.

2. The method as in claim 1 comprising:
   encoding second embedded data in the relief printing member by modifying surfaces of a second plurality of halftone dots.

3. The method as in claim 1 comprising:
   ablating the surfaces of the first plurality of halftone dots with a laser to modify the surfaces of the first plurality of halftone dots.

* * * * *